United States Patent
Henrich et al.

(10) Patent No.: US 11,187,263 B2
(45) Date of Patent: Nov. 30, 2021

(54) DEVICE TO MINIMIZE VIBRATIONS FROM A MOTOR VEHICLE TRANSMISSION TO A GEAR SHIFT LEVER

(71) Applicant: Kuster Holding GmbH, Ehringshausen (DE)

(72) Inventors: Willi Henrich, Ehringshausen (DE); Viktor Kremer, Biebertal (DE)

(73) Assignee: Küster Holding GmbH, Ehringshausen (DE)

( * ) Notice: Subject to any disclaimer, the term of this patent is extended or adjusted under 35 U.S.C. 154(b) by 113 days.

(21) Appl. No.: 16/540,120

(22) Filed: Aug. 14, 2019

(65) Prior Publication Data

US 2019/0368537 A1  Dec. 5, 2019

Related U.S. Application Data

(62) Division of application No. 15/027,542, filed as application No. PCT/EP2014/072345 on Oct. 17, 2014, now abandoned.

(30) Foreign Application Priority Data

Oct. 23, 2013 (DE) .......................... 202013104768.6

(51) Int. Cl.
  *F16C 11/06* (2006.01)
  *F16C 11/08* (2006.01)
  (Continued)

(52) U.S. Cl.
  CPC .............. *F16C 11/083* (2013.01); *F16C 7/02* (2013.01); *F16C 11/0695* (2013.01); *F16F 1/376* (2013.01); *F16H 61/26* (2013.01)

(58) Field of Classification Search
  CPC ...... F16C 11/0652; F16C 11/083; F16C 7/02; F16C 11/0695; F16F 1/376; F16H 61/26
  See application file for complete search history.

(56) References Cited

U.S. PATENT DOCUMENTS 2,710,208 A   6/1955  Ross et al.
3,350,042 A  10/1967  Stewart et al.
(Continued)

FOREIGN PATENT DOCUMENTS

DE  19755284 A1    6/1999
DE  10206085 A1 *  8/2003  .......... F16C 11/0652
DE  10206085 A1    8/2003

OTHER PUBLICATIONS

Machine translation of DE 10206085. (Year: 2003).*
Int'l Search Report dated Mar. 18, 2015 in Int'l Application No. PCT/EP2014/072345.

*Primary Examiner* — Randell J Krug
(74) *Attorney, Agent, or Firm* — Rogowski Law LLC

(57) ABSTRACT

A device (1) for removably securing an actuating member to an input or output element, such as to a gear shift lever or a transmission of a motor vehicle, has a mounting point (10) for the actuating member, and a receptacle (20) for a mounting element of the input or output element. The receptacle (20) has an outer receptacle element (30) and an inner receptacle element (40) arranged therein, between which is an elastic damping element (50). To reduce undesired vibrations from the transmission or the actuating member to the interior of the vehicle, while securing the actuating member to the mounting device in a simpler manner, the damping element is a separate component which has a wave profile (52) on its wall (51) facing the outer receptacle element (30), and the mounting point (10) has a threaded insert (11) for securing the actuating member.

15 Claims, 3 Drawing Sheets

(51) Int. Cl.
    *F16C 7/02*     (2006.01)
    *F16F 1/376*     (2006.01)
    *F16H 61/26*     (2006.01)

(56) References Cited

U.S. PATENT DOCUMENTS

| | | |
|---|---|---|
| 3,780,596 A | 12/1973 | Takahashi et al. |
| 4,259,027 A | 3/1981 | Hata |
| 5,265,495 A | 11/1993 | Bung et al. |
| 2003/0205439 A1* | 11/2003 | Henrich .................. G05G 7/10 188/344 |

* cited by examiner

DEVICE TO MINIMIZE VIBRATIONS FROM A MOTOR VEHICLE TRANSMISSION TO A GEAR SHIFT LEVER

CROSS-REFERENCE TO RELATED APPLICATIONS

This application is a division of U.S. application Ser. No. 15/027,542, filed Apr. 6, 2016, pending, which is a national stage application (under 35 U.S.C. § 371) of PCT/EP2014/072345, filed Oct. 17, 2014, which claims benefit of German application No. 20 2013 104 768.6, filed Oct. 23, 2013, the contents of each of which are incorporated by reference herein.

BACKGROUND OF THE INVENTION

Technical Field and State of the Art

The present invention relates to a device for detachably mounting an actuating member on an input or output element, for example, on a gear shift lever or transmission of a motor vehicle, by employing a mounting site to secure the actuating member, and with a receptacle to secure a mounting element of the input or output element, whereby the receptacle has an essentially eyelet-like outer receiving element and an inner receiving element arranged therein, between which an elastic damping element is arranged.

The invention also relates to an actuating member having such a mounting device. Moreover, the invention relates to a shifting device for the transmission of a motor vehicle.

Mounting devices of the above-mentioned type are known, for example, from U.S. Pat. No. 5,265,495 A1 and European patent specification EP 2 278 178 B1, and they are used, among other things in the automotive sector, to mount an actuating member on the end of the shifting lever and of the gear selector lever, said actuating member being, for example, an actuating cable assembly or an actuating rod by means of which—in the case of a manual transmission—the shifting motion executed by the driver when he/she actuates the shifting lever is transmitted to the selector lever on the transmission housing. In each case, one end of the actuating member is connected to a mounting site of the mounting device which, in turn, has a receptacle that is secured to a mounting element of the output or input element, for example, secured to an actuating journal of the gear selector lever or to a mounting element of the shifting lever. The elastic damping element in the receptacle, which is arranged between the eyelet-like outer receiving element and the inner receiving element arranged therein, serves to damp the transfer of vibrations of the transmission from the gear selector lever to the actuating member and then further from the actuating member to the shifting lever, so that ultimately, undesired vibrations on the shifting lever or in the interior of the vehicle are prevented to the greatest extent possible.

Additional mounting devices of the above-mentioned type are also known from German patent application DE 197 55 284 A1 as well as from European patent application EP 1 798 431 A1.

German patent application DE 197 55 284 A1 discloses a ball-and-socket joint with a joint ball arranged on a journal, sections of which are surrounded by a bearing shell, whereby this bearing shell having an inner circumferential surface in the form of a spherical cap is inserted with its essentially cylindrical outer circumferential surface into a receiving bore of a housing. Here, the bearing shell is embedded on its outer circumferential surface in a sleeve that is made of a rubber-elastic elastomer and that rests against the receiving bore. The mounting of the actuating member is such that a lever extends from the housing and is provided with an external thread on the circumferential surface, whereby a shifting lever (not shown here) of the motor vehicle can be affixed to this external thread.

European patent application EP 1 798 431 A1 also discloses a mounting device having a receptacle with an outer receiving element and an inner receiving element arranged therein, between which an elastic damping element is arranged. In the case of this prior-art mounting device, the damping element has a cylindrical configuration. The mounting that serves to secure a moving member is achieved by means of encapsulation by injection molding.

German patent application DE 197 31 039 A1 describes a device for mounting a control cable to the variable-speed transmission of a motor vehicle, whereby the device consists of a control cable whose end piece is connected to a receiving sleeve that is secured in the device, and the device also has a damping element with a plastic core which is arranged therein and whose opening accommodates a transmission mounting element. This mounting device, which is known from the state of the art, also involves the mounting of a mounting member to the input or output element by means of encapsulation by injection molding.

In spite of such a damping element, the mounting devices known from the state of the art—measured by modern driving comfort requirements in motor vehicles—often still exhibit inadequate vibration suppression properties. This also applies when it comes to modern noise comfort levels.

Before this backdrop, an objective of the present invention is to improve a mounting device as well as an actuating member by putting forward a mounting device of the type described above in such a way that the transfer of undesired vibrations from the transmission via the actuating member into the interior of the vehicle is reduced to a minimum. At the same time, the mounting of the actuating member to the mounting device should be technically simplified.

SUMMARY OF THE INVENTION

A device for detachably mounting an actuating member to an input or output element according to an embodiment of the invention has a damping element configured as a separate part. The damping element, on its wall facing the outer or inner receiving element, has an intermittently and/or alternatingly configured wave profile, and the mounting site has a threaded insert to secure the actuating member.

According to embodiments of the invention, it has been realized that a damping element that is arranged between the inner and the outer receiving element of the mounting device and that has a wavy outer wall, that is to say, a wall having a wave profile facing the outer receiving element, has greatly improved damping properties as far as the undesired transfer of vibrations to the transmitting member is concerned. The reason for this is, among other things, that due to the profile, especially the wave profile, the contact surface of the damping element towards the outer receiving element is reduced to such an extent that the transfer of disturbing vibrations is advantageously suppressed.

Owing to the suppression of disturbing vibrations, it is possible to facilitate the mounting of the actuating member to the mounting device in the manner according to the invention in that the mounting site of the mounting device has a threaded insert on which the actuating member can be secured by means of a screw in an advantageous manner. In comparison to the state of the art, in which the actuating member is injection-molded directly into the mounting site, a threaded insert allows a cost-effective, flexible and especially detachable mounting of the actuating member to the mounting device.

According to a first advantageous embodiment of the invention, the profile is intermittently formed on the outer wall of the damping element and/or it is made up of alternating partially circular, especially semi-circular, projections and depressions. Experiments have shown that a wave profile configured in this manner very effectively improves the damping properties.

In another advantageous embodiment of the invention, in order to facilitate the joining of the mounting device or the insertion of the damping element between the eyelet-like outer receiving element and the inner receiving element arranged therein, at least one of the rims or edges of the damping element is beveled, especially canted or rounded off.

In order to automatically assemble the mounting device, it is advantageous for the damping element to be configured as a cylindrical, annular part.

A particularly cost-effective and stable mounting device is achieved in that the outer receiving element and the mounting site are configured in one piece, especially as a shared base body.

In order to ensure a compensation for angular movements between the actuating member and the mounting element of the input or output element, in another advantageous embodiment of the invention, it is provided that the outer receiving element, the inner receiving element and/or the damping element is/are shaped so as to be essentially annular and/or in the form of a hollow cylinder. In this manner, it is possible to execute a rotational motion of the mounting device or of the actuating member relative to the mounting element of the input or output element around the longitudinal axis or rotational axis of the eyelet-like outer receiving element.

A particularly lightweight and especially detachable connection between the mounting device and the mounting element is achieved in that, according to another advantageous embodiment of the invention, the inner receiving element has a bushing in which the mounting element of the input or output element can be secured, especially by means of a latch and/or clip connection.

In order for the degrees of freedom of the rotational motion of the mounting device or of the actuating member relative to the mounting element of the input or output element to be expanded to three axes, it can advantageously be provided for the bushing to be configured as a socket of a ball-and-socket joint in which a mounting element of the input or output element having a ball head can be latched or clipped in place.

Moreover, it can be provided for the inner receiving element to have a preferably cylindrical sleeve in which the bushing is arranged. Such a two-part structure consisting of a sleeve and a bushing accommodated therein makes it possible to adapt the inner receiving element, on the one hand, to the shape of the mounting element by means of the bushing and, on the other hand, to the shape of the outer receiving element by means of the sleeve. In this manner, the mounting device can be adapted to various input or output elements in an altogether flexible manner.

In order to secure the bushing in the assembly position in at least one axial direction inside the sleeve, in another advantageous embodiment of the invention, it is provided for the sleeve to have a tapered passage by means of which the preferably corresponding tapered bushing engages with a positive fit.

According to another advantageous embodiment of the invention, it is provided for the inner receiving element to have a closure element on each end in the axial direction relative to the eyelet-like outer receiving element, by means of which the inner receiving element, especially the sleeve and/or the bushing, is secured to the outer receiving element in the axial direction.

Especially preferably, the bushing and at least one of the two closure elements are configured in one piece, especially in the form of a hollow cylinder having an encircling collar or flange at one end.

Preferably, each of the closure elements at the ends are configured in such a way that they have a larger radial extension than the sleeve or the bushing, so that a positive fit axially secures the inner receiving element via the closure element that is in contact with the outer receiving element on the front face or on a flat side. It is conceivable, for example, that at least one of the two closure elements is configured in the form of a cover or plate or perforated disc. The perforated disc configuration is especially well-suited for the side of the inner or outer receiving element via which the mounting element, especially the ball joint head, is inserted into the bushing.

In order to affix the closure element to the sleeve, according to another advantageous embodiment of the invention, it is provided for at least one of the two closure elements to have a groove which encircles the front face and with which the sleeve engages when in the assembly position. It is conceivable, for example, for the sleeve.

According to another advantageous embodiment of the invention, the threaded insert is configured as a nut, especially as a polygonal nut. Here, one can especially make use of standard components, which has a positive effect on the production costs of the mounting device.

In order to technically further simplify the mounting of the actuating member at the mounting site, especially to ensure a well-defined mounting, it is provided according to another advantageous embodiment of the invention for the mounting site to have a support and/or a guide for the actuating member that is to be mounted, especially for a connection tab of an actuating member that is to be mounted.

An independent idea of the invention relates to an actuating member having at least one mounting device of the above-mentioned type arranged at one end, preferably in the area of a connection tab.

According to another advantageous embodiment, it is provided for the axis of the threaded insert or of the nut to run orthogonally to the axis of the receptacle. This translates into advantages during the assembly and adjustment of the device in a motor vehicle, since the force application point of the tool is in an essentially horizontal plane.

According to an especially advantageous embodiment of the actuating member, it is provided that a hole, especially a slot, is provided at least at one end, preferably in the area of a connection tab, through which a screw can be screwed into the threaded insert in order to secure the actuating member to the device. Another advantageous embodiment of the invention provides for the damping element to be a component that can be handled separately.

Additional objectives, advantages, features and application possibilities of the present invention ensue from the description below of an embodiment making reference to the drawing. In this context, all of the described and/or depicted features, either on their own or in any meaningful combination, constitute the subject matter of the present invention, also irrespective of their compilation in the claims or the claims to which they refer back.

DESCRIPTION OF THE DRAWINGS

The following is shown.

DETAILED DESCRIPTION

Figure 1:
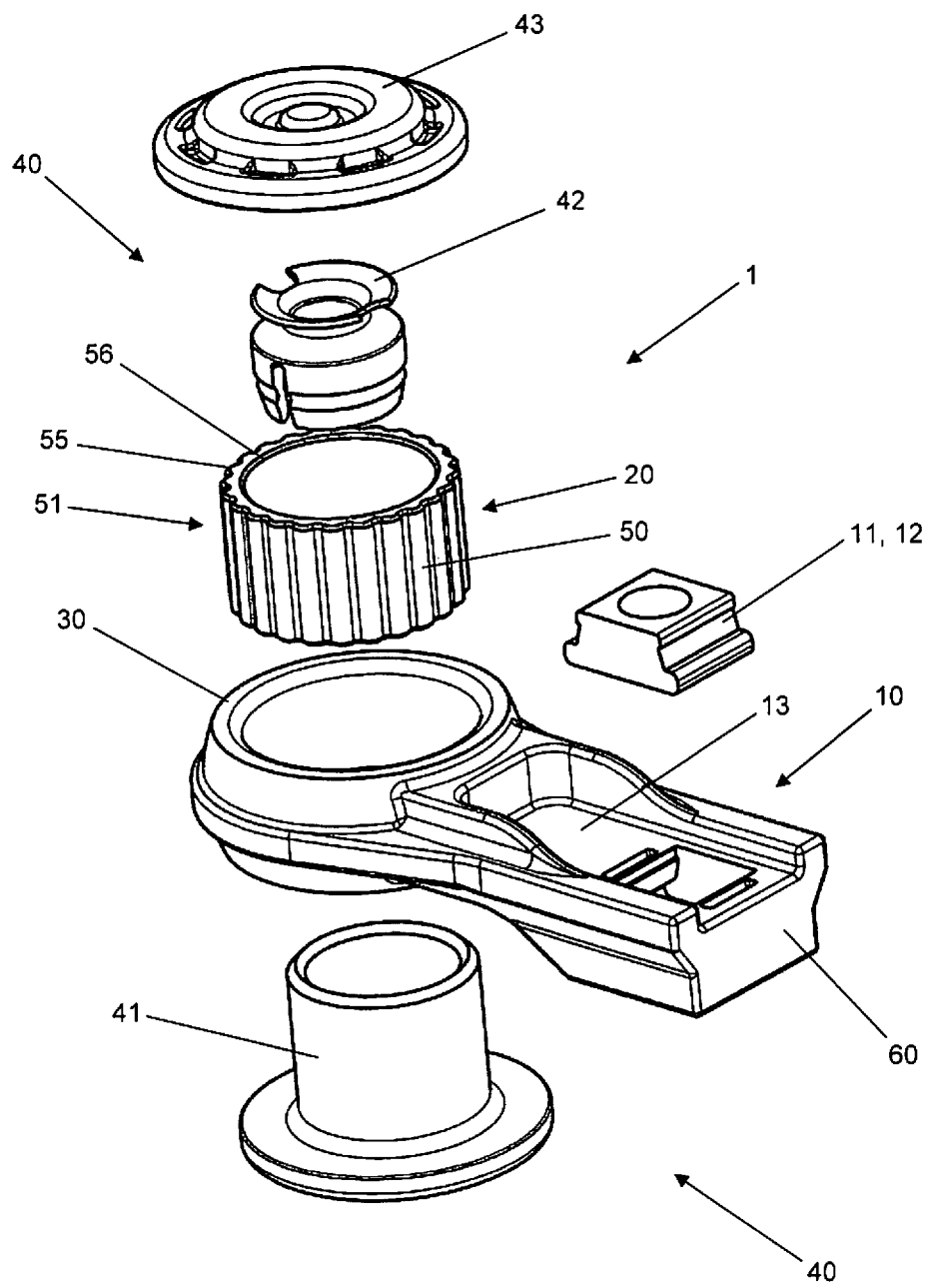
FIG. 1 an exploded view of a possible embodiment of a device according to the invention for detachably mounting an actuating member on an input or output element, FIG. 2 a lengthwise section through the joined device according to claim FIG. 1, FIG. 3 a top view of the damping element of the device according to FIG. 1.
Figure 2:
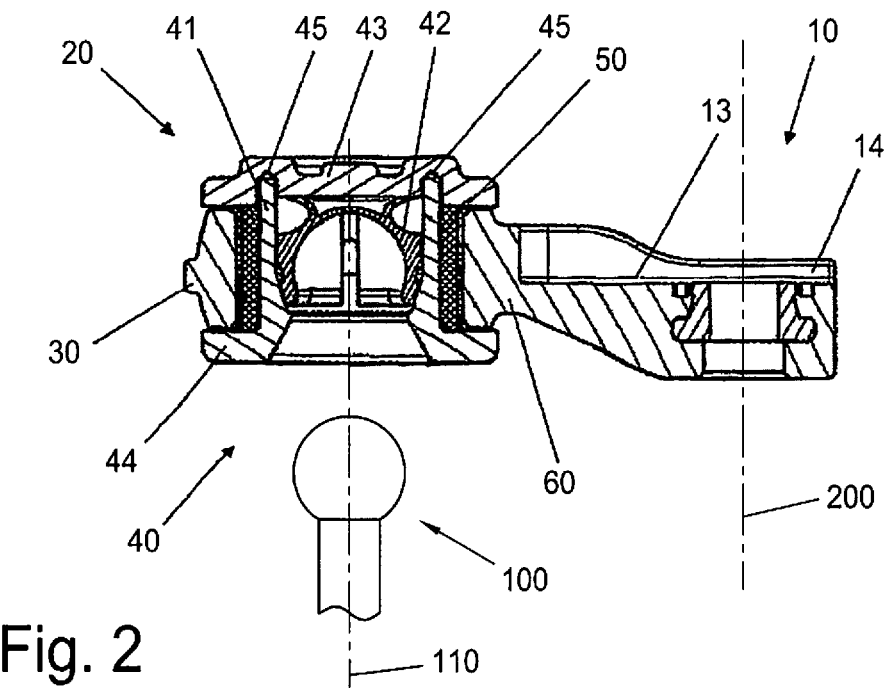

FIGS. 1 and 2 show a possible embodiment of a device 1 according to the invention for detachably mounting an actuating member to an input or output element, for example, to a shifting lever or to a transmission of a motor vehicle. For this purpose, the device 1 has a mounting site 10 to secure the actuating member as well as a receptacle 20 to secure a mounting element of the input or output element, whereby the receptacle 20 has an essentially eyelet-like outer receiving element 30 and an inner receiving element 40 arranged therein.

In an advantageous manner, in the embodiment shown in FIGS. 1 and 2, the outer receiving element 30 and the mounting site 10 are configured in one piece, thereby forming a shared base body, whereby the base body has an essentially elongated shape, at one end of which the eyelet-shaped, approximately annular, outer receiving element 30, and at whose other end, the mounting site 10 to secure the actuating member, are arranged. Between the outer receiving element 30 and the inner receiving element 40, according to the invention, there is an elastic damping element 50 that has an encircling wave profile 52 on its outer wall 51 facing the outer receiving element 30.

As can also be seen in FIGS. 1 and 2, the inner receiving element 40 consists of four parts altogether, namely, a cover-like closure element 43, a perforated disc-like closure element 44, a sleeve 41 as well as a bushing 42 accommodated therein.

In the embodiment shown in FIGS. 1 and 2, the bushing 42 is configured as a socket of a ball-and-socket joint in which a mounting element of the input or output element 100 having a ball head can be secured. In the present embodiment, the joint socket especially has a latch or clip connection means with which the mounting element 100 can be secured in a particularly simple manner in the inner receiving element 40, that is to say, in the bushing 42, especially so that it can be detached again.

Moreover, the bushing 42 in the present embodiment is accommodated in a cylindrical sleeve 41 that has a tapered passage 46 by means of which, in the assembly position, the corresponding tapered bushing 42 is secured in an axial direction within the sleeve 41.

In the opposite axial direction, the bushing 42 in the sleeve 41 is secured by the plate-like closure element 43 that has a groove 45 which encircles the front face and with which the sleeve 41 engages when in the assembly position. In the radial direction, the closure element 43 has a greater extension than the sleeve 41 and, with its overlapping area, it comes into contact with the outer receiving element 30, as a result of which the inner receiving element 40 is secured with a positive fit relative to the outer receiving element 30 in the axial direction.

On the opposite side of the plate-like closure element 43, there is another closure element 44 that, in the present embodiment, is configured in one piece with the sleeve 41. The sleeve 41 and the closure element 44 together form a hollow cylinder having an encircling collar or flange that is made up of the perforated disc-like closure element 44. Owing to the opening in the perforated disc-like receiving element 40, access is created through which the mounting element of the input or output element can be inserted into the bushing 42.

As can also be seen in FIGS. 1 and 2, the mounting site 10 has a support 13 as well as guides 14 extending laterally therefrom which accommodate the actuating member that is to be mounted (not shown here), especially a connection tab of an actuating member that is to be mounted.

In order to secure the actuating member at the mounting site 10, according to the invention, it is provided for the mounting site 10 to have a threaded insert 11. In the embodiment shown here, the threaded insert 11 is a polygonal pierce nut 12 whose cross section is essentially trapezoidal. Moreover, it can also be seen in FIGS. 1 and 2 that the nut 22 is integrated by means of injection molding into the base body 60 that, in this case, is made of plastic. It is also conceivable for the threaded element 11 to be inserted, clipped, latched or glued into a matching opening in the base body 60. The polygonal outer contour of the threaded element advantageously provides anti-twist protection in relation to the center axis 200 of the mounting site 10.

In order to ensure the length adjustment of the actuating member that is to be mounted (not shown here), it can also be provided for the actuating member, especially in the area of the connection tab, to have a slot, thereby allowing a continuously variable adjustment and pre-fixation of the mounting device 1 to the actuating member.

Figure 3:
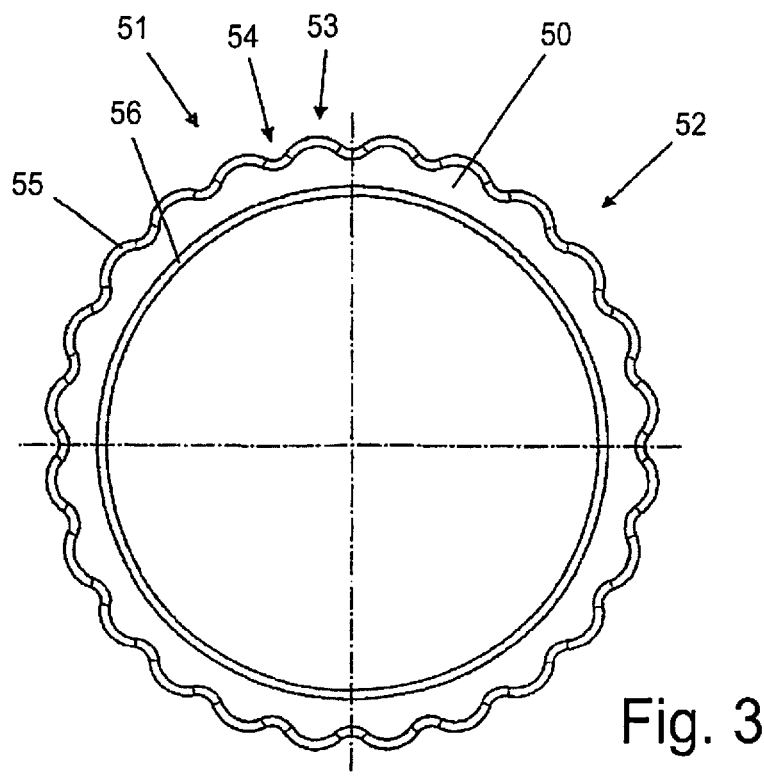

FIG. 3 shows the elastic damping element 50 according to the invention which has an encircling wave profile 52 on the outer walls 51 facing the outer receiving element 30. In the embodiment shown here, the wave profile is made up of intermittent, especially alternating semi-circular projections 53 and depressions 54. Experiments have shown that a damping element 50 configured in this manner has markedly improved damping properties when it comes to the transfer of vibrations from the transmission via the actuating member to the selector lever of a motor vehicle. The damping properties are also improved in that the damping element 50—as in the present embodiment—is configured as a separate part with an essentially annular cross section without material interruptions. Preferably, the damping element 50 is made of rubber or of a rubber-like synthetic elastomer.

As can be seen particularly in FIGS. 1 and 3, the rims 55, 56 on the front face of the damping element 50 are beveled. This facilitates the insertion of the damping element 50 between the eyelet-like outer receiving element 30 and the inner receiving element 40 arranged therein.

In order to also achieve a damping in the direction of all three axes of the vehicle, especially also the Z-axis oriented upwards relative to the vehicle, that is to say, the vertical vehicle axis, according to an independent aspect of the invention, projections or profiled end sections can be provided on the front faces of the damping element. For this purpose, for example, an encircling annular projection is arranged on at least one front face of the damping element. In this context, it has proven to be advantageous for the diameter of the annular projection to be greater than the wall thickness of the cylindrical part of the damping element 50.

Figure 4:
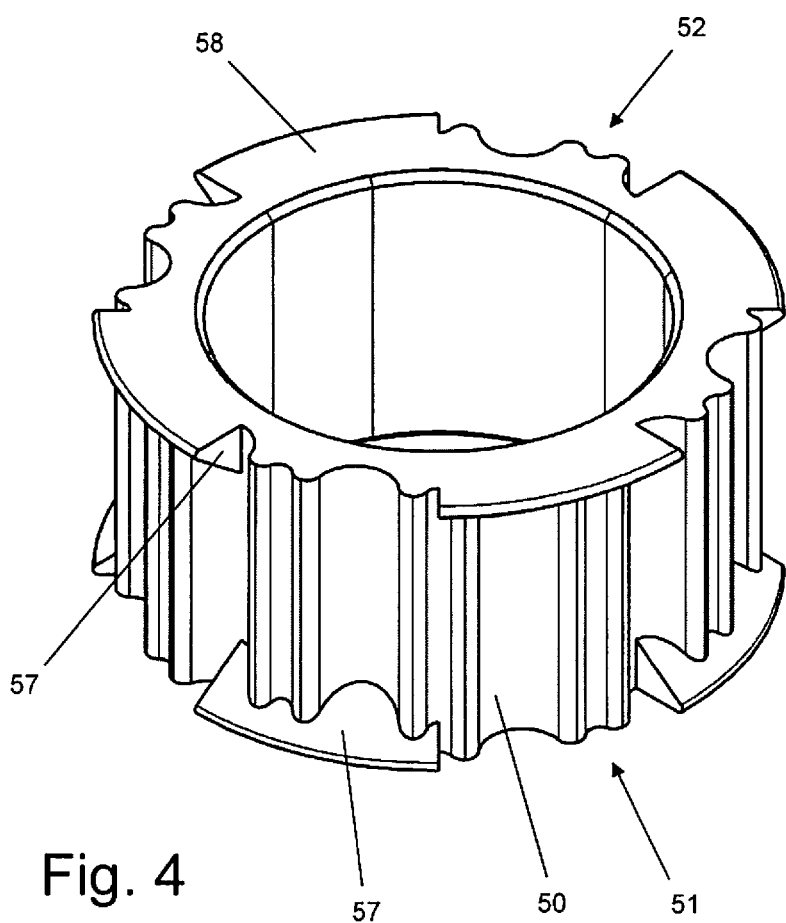
FIG. 4 a perspective view of another embodiment of the damping element.

FIG. 4 shows another embodiment of the damping element that is designated by the reference numeral 50. On the front faces 58, there are projections 57 that extend beyond the outer wall of the damping element 50 and that are tapered from the outer wall 51 towards the front face 58.

With the projections 57, a damping is achieved in the direction of the Z-axis of the vehicle (not shown in FIG. 4).

The projections 57 are arranged so as to be offset on the opposite front faces 58; in this manner, the damping element can be produced cost-effectively since a simple mold removal is possible when this element is made using a mold.

Another embodiment for achieving damping in the direction of the Z-axis of the vehicle (not shown in FIG. 4) consists of arranging a soft component on the encircling collar of the sleeve 41 (not shown in FIG. 4) or on the side of the closure element 43 (not shown in FIG. 4) facing the damping element.

The production of a sleeve or closure element configured in this manner is known from the state of the art and is carried out in the form of, for example, a 2-component part. This means that the soft component is injection-molded in an injection mold onto the intended surfaces of the sleeve 41 or of the closure element 43.

Here, the soft component can be configured as a nub or wedge or web arranged so as to encircle the collar of the sleeve 41 or the side of the closure element 43 facing the damping element 50. The number of nubs or wedges or webs can vary.

In contrast, the base body 60 as well as the bushing 42, the sleeve 41 and the closure elements 43, 44 are preferably made of plastic, for example, of polyamide that can optionally be glass-reinforced and/or that can contain a polytetrafluoroethylene (PTFE) component. The use of such plastics is very advantageous with an eye towards reducing weight as well as from the vantage point of production engineering.

LIST OF REFERENCE NUMERALS

1 mounting device
10 mounting site
11 threaded insert
12 nut
13 support
14 guide
20 receptacle
30 outer receiving element
40 inner receiving element
41 sleeve
42 bushing
43 closure element
44 closure element
45 groove
50 damping element
51 outer wall of the damping element
52 wave profile
53 projection
54 depression
55 rim
56 rim
57 projection
58 front face
60 base body
100 input or output element
110 axis of inner receiving element
200 axis of threaded insert

The invention claimed is:

1. A device to minimize vibrations transmitted from a motor vehicle transmission to a gear shift lever, comprising:
a mounting site defining a center axis and having an internally-threaded threaded insert therein configured to detachably secure the gear shift lever to the mounting site, said threaded insert having an outer contour of a shape that resists twisting of the threaded insert about the center axis when said threaded insert is held in the mounting site;
an outer receiving element arranged in a receptacle, said outer receiving element defining an inner receiving element configured to receive a mounting element of an input or output element of the transmission, wherein the outer receiving element and the mounting site are configured in one piece and have a shared base body;
wherein the threaded insert is a nut or a polygonal nut that is integrated by means of injection molding into the base body; and
an elastic damping element arranged between the outer receiving element and the inner receiving element, the damping element having a wall with a wave profile facing the outer or inner receiving element.

2. The device according to claim 1, wherein the wave profile is configured of alternating partially circular or semi-circular projections and depressions.

3. The device according to claim 1, wherein the damping element has at least one rim that is beveled, canted or rounded off.

4. The device according to claim 1, wherein at least one of the outer receiving element, the inner receiving element and the damping element has an annular or hollow cylindrical shape.

5. The device according to claim 1, wherein the threaded insert has an axis and the receptacle has an axis, and the axis of the threaded insert runs orthogonally to the axis of the receptacle.

6. The device according to claim 1, wherein the mounting site to which an actuating member is secured has a support or a guide for the actuating member.

7. The device according to claim 1, wherein an encircling, annular projection is arranged on at least one front face of the damping element.

8. The device according to claim 1, wherein the inner receiving element has a bushing in which the mounting element of the input or output element is securable.

9. The device according to claim 8, wherein the bushing is configured as a socket of a ball-and-socket joint, and the mounting element of the input or output element has a ball head that can be latched or clipped into said socket.

10. The device according to claim 8, wherein the inner receiving element has a cylindrical sleeve in which the bushing is arranged.

11. The device according to claim 10, wherein the sleeve has a tapered passage, and the bushing has a corresponding taper that is securable in at least one axial direction within the sleeve.

12. The device according to claim 1, wherein the inner receiving element has a closure element on each end in the axial direction relative to the eyelet-like outer receiving element that is used to secure the inner receiving element to the outer receiving element in the axial direction.

13. The device according to claim 12, wherein the bushing and at least one of the two closure elements are configured in one piece in the form of a hollow cylinder having an encircling collar or flange at one end.

14. The device according to claim 12, wherein at least one of the two closure elements is configured in the form of a cover or plate or perforated disc.

15. The device according to claim 12, wherein at least one of the two closure elements has an encircling groove with which the sleeve engages when in an assembly position.

\* \* \* \* \*